Patented Aug. 30, 1932

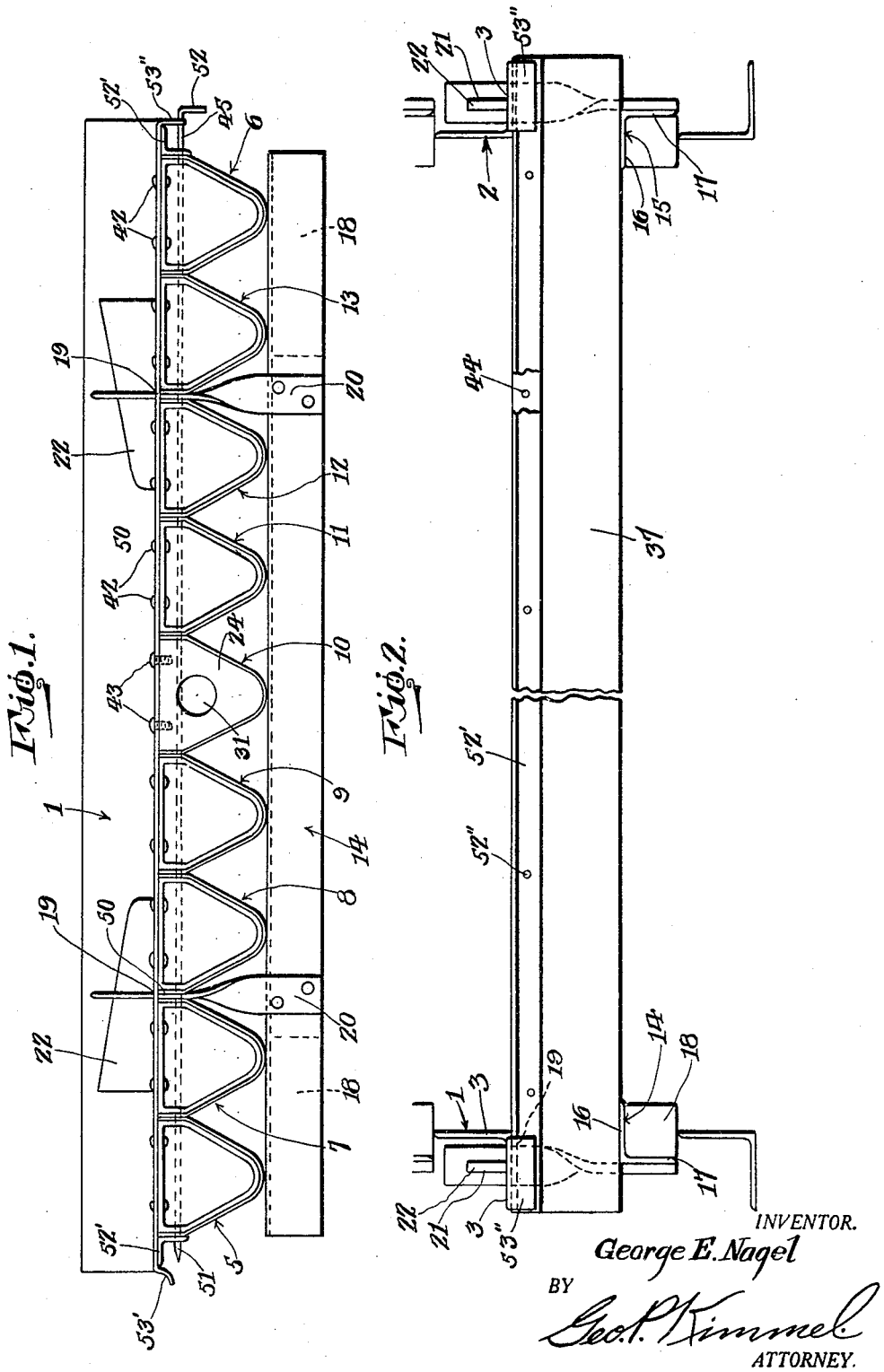

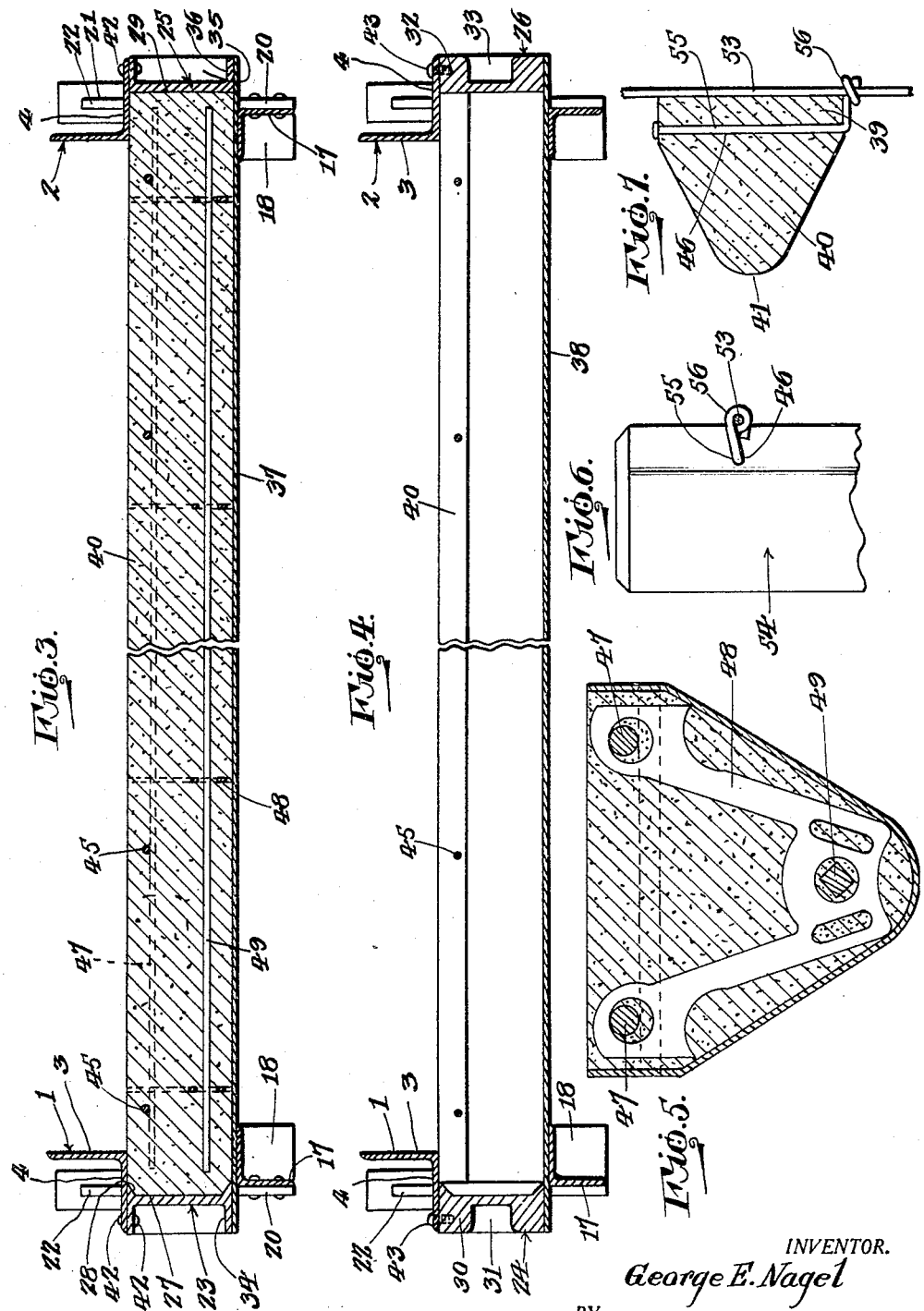

1,875,256

UNITED STATES PATENT OFFICE

GEORGE E. NAGEL, OF COLUMBUS, OHIO

GANG MOLD FOR FENCE POST CONSTRUCTION

Application filed February 2, 1931. Serial No. 513,014.

This invention relates to a gang mold designed primarily for molding concrete fence posts, but it is to be understood that a mold in accordance with this invention may be employed in any connection for which it may be found applicable, and the invention has for its object to provide, in a manner as hereinafter set forth a mold of the class referred to for expeditiously molding simultaneously a series of apertured, reinforced concrete fence posts and so constructed and arranged to enable the quick discharge therefrom of the molded posts when occasion requires.

A further object of the invention is to provide, in a manner as hereinafter set forth a gang mold for molding at one time a series of apertured, reinforced concrete fence posts, and with the elements of the mold so constructed as to permit the quick assembling and dis-assembling of the latter when desired.

Further objects of the invention are to provide, in a manner as hereinafter set forth a gang mold for the purpose referred to which is simple in its construction and arrangement, strong, durable, compact, thoroughly efficient in its use, readily set up and comparatively inexpensive.

With the foregoing and other objects in view the invention consists of the novel construction, combination and arrangement of parts as hereinafter more specifically described and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an end view of the gang mold.

Figure 2 is a side elevation, broken away of one of the outer molding units.

Figure 3 is a longitudinal sectional view, broken away through a molded post within one of the outer molding units.

Figure 4 is a view similar to Figure 3 of the central molding unit.

Figure 5 is a cross sectional view of a molding unit carrying a reinforced molded post.

Figure 6 is a fragmentary view in elevation of the upper portion of the molded post with a fence wire anchored thereto.

Figure 7 is a sectional plan of the molded post illustrating a fence wire anchored thereto.

A gang mold in accordance with this invention includes a pair of oppositely disposed angle-shape upper holders 1, 2 and each of which consists of a vertical flange 3 and a horizontal flange 4 extending outwardly at right angles to the bottom of flange 3. The length of each holder is slightly greater than the number of molding units constituting the gang, and as illustrated by way of example, eleven molding units are employed to provide the gang, the latter consisting of a central or inner molding unit, two sets of intermediate molding units and a pair of outer or end molding units. Each set is arranged between an outer and the central unit. The outer units are indicated 5, 6, the units of one set 7, 8 and 9, the central unit 10 and the units of the other set at 11, 12 and 13. The holders are positioned at the ends of the units. The units of the gang are arranged in sidewise opposed relation.

The mold also includes a pair of oppositely disposed angle shape lower holders 14, 15 and each of which consists of a vertical flange 16 and a horizontal flange 17 extending inwardly from the upper end of flange 16. The lower holders are of slightly less length than the upper holders, but project beyond the outer molding units 5, 6.

The upper holders are positioned at the top of the molding units at opposite ends of the latter. The lower holders are at the bottom of the molding units and at opposite ends of the latter. The lower holders are inset with respect to the upper carriers. The flanges of the lower holders are of less width than that of the upper holders. Secured to the inner face of each upper holder are spaced supporting blocks 18 for seating on the upper carriers of a lower gang mold when the molds are stacked during the curing period for the posts. The blocks 18 also facilitate the stacking of one gang upon the other.

The horizontal flanges 4 of each upper holder are provided with a pair of spaced, parallel transverse slots 19. Extending through the slots 19 are the upper portions of vertically disposed, torsionally twisted coupling members 20 which are secured to the outer faces of the vertical flanges of the lower holders. Each coupling member 20 has its upper portion formed with a vertical slot 21. Extending through the slots 21 are wedge members 22 which coact with the horizontal flanges of the upper and lower holders for detachably clamping the body members of the molding units between and to the holders.

Each molding unit includes a body member, a fixed head for one end of the latter and a fixed head for the other end of the latter. The heads for one end of the units 5, 6, 7, 8, 9, 11, 12 and 13 are indicated at 23. The head for one end of the unit 10 is indicated at 24. The heads for the other end of the units 5, 6, 7, 8, 9, 11, 12 and 13 are indicated at 25. The head for the other end of the unit 10 is indicated at 26. Each of the heads 23 and the head 24 has its inner face formed with a cavity 27 provided with bevelled walls 28. Each of the heads 25 and the head 26 has a squared uninterrupted inner face 29. The head 24 has a thickened body portion 30 formed with a socket 31 opening at the outer face of the head. The head 26 has a thickened body portion 32 provided with a socket 33 opening at the outer face of the head. Each head 23 is formed on its outer face with an endless flange 34. Each head 25 is formed with an outwardly opening recess 35 to provide an endless flange 36.

The body members of the units 5, 6, 7, 8, 9, 11, 12 and 13 are indicated at 37. The body member of unit 10 is indicated at 38. Each body member has an open top, a pair of side walls and a bottom. Each side wall includes an inclined portion merging into a perpendicular portion. The bottom of each member is rounded. The inclined portions of the side walls are oppositely disposed and each extends at an outward inclination from the rounded bottom to a perpendicular portion. The heads are of the same contour as that of the body members and close the ends of the latter. The heads are removably and snugly seated within the body members at one end thereof. The outer faces of the heads are flush with the outer ends of the body members. The shape of the body members provides for molding posts having a rectangular part 39 merging into a triangular part 40 having a rounded end 41, Figure 7. The horizontal flanges of the upper holders close the open tops of said body members adjacent the heads. The said flanges extend inwardly from the heads.

The heads 23, 24 and 25, 26 are fixedly secured to the horizontal flanges of holders 1 and 2 respectively and depend from the latter. Holdfast devices 42 are employed for securing heads 23 and 25 to holders 1 and 2 and the holdfast device 43 secures heads 24 and 26 to holders 1 and 2.

The perpendicular portions of each body member are formed with spaced aligning openings 44. The openings 44 of one body member align with the openings 44 of an adjacent body member. Each set of aligning openings 44 has extending therethrough a cylindrical rod 45 forming a transverse opening 46 in the rectangular part of the post. The number of sets of aligning openings can be as desired, but there will be associated with each set of openings a rod 45. The openings 46 are arranged in parallelism and preferably in proximity to the point of mergence of the part 39 with the part 40.

The rods 45 also provide means for suspending the reinforcing rods 47 for the post during the molding operation. The rods 47 extend through spaced spacer members 48. Extending through the members 48 is a reinforcing rod 49. The rods 47 extend through the top of members 48 and are arranged in spaced relation. The rod 49 extends through the base of members 48. The rods 47 and 49 are disposed lengthwise of the post. Each set of reinforcing rods and their associated spacer members is arranged in a molding unit prior to the pouring of the concrete.

The perpendicular portions of one body member are welded to perpendicular portions of adjacent body members whereby the body members and heads 25, 26 of each gang are bodily shiftable.

The coupling members 20 extend upwardly through slots 50 arranged between units 7 and 8 and between units 12 and 13.

The rods 45 are pointed at one end, as at 51 and at the other end have a handle piece 52.

The body members of the units 5, 6 have secured to the outer sides thereof and flush with the top edges of the latter a reinforcing angle iron 52' coextensive therewith. The horizontal flanges of the irons 52' project outwardly from the upper ends of the vertical flanges. The vertical flanges of said irons having openings 52" registering with the openings 44.

The flanges 3 of the carriers 1, 2 are bent downwardly at each end as at 53', 53" for centering the carriers relative to the body members of the molding units. The bent portion 53' is curved outwardly.

In Figures 6 and 7, a fence wire 53 is shown coupled to the post 54 by a nail tie 55 extending through an opening 46 and twisted as at 56 around the wire 53.

The sockets 31, 33 in the heads 24, 26 respectively provide means whereby such heads will act as trunnions when inverting the mold when it is desired to discharge the posts. A grab hook is adapted to be inserted in sockets 31, 32 when inverting the mold. When the mold is inverted the carriers and heads are removed from the body members of the units and the body members are then moved from off the posts.

What I claim is:—

1. A gang mold comprising a series of sidewise arranged bodily movable molding units, each including an open top body member and a pair of removable heads, said heads closing the ends of said member, a pair of spaced upper holders, said holders being fixed to the removable heads of the units, a pair of spaced lower holders, and means for detachably coupling said upper and lower holders together and to the body members of said units.

2. A gang mold comprising a series of sidewise arranged bodily movable molding units, each including an open top body member and a pair of removable heads, said heads closing the ends of said member, a pair of spaced upper holders, said holders being fixed to the removable heads of the units, extending inwardly from said heads and across the open tops of said members for closing the tops of the latter adjacent said heads, a pair of spaced lower holders, said lower holders positioned against and adjacent the ends of the bottoms of said members, means for detachably coupling said upper and lower holders together and to the body members of said units, said body members having aligning openings arranged in sets, and a rod extending through each set of openings.

3. A gang mold comprising a series of sidewise arranged bodily movable molding units including a central unit, each including an open top body member and a pair of removable heads, said heads closing the ends of said member, a pair of spaced upper holders, said holders being fixed to the removable heads of the units, a pair of spaced lower holders, means for detachably coupling said upper and lower holders together and to the body members of said central unit, and the units of said series having the outer faces of the heads thereof provided with sockets to receive trunnions when inverting the mold.

4. A gang mold comprising a series of sidewise arranged bodily movable molding units, each including an open top body member and a pair of removable heads, said heads closing the ends of said member, a pair of spaced upper holders, said holders being fixed to the removable heads of the units, a pair of spaced lower holders, means for detachably coupling said upper and lower holders together and to the body members of said units, each of said lower holders formed of a vertical and an inwardly extending horizontal flange at the top of the vertical flange, and spaced supports secured to the lower face of the horizontal flange and inner face of the vertical flange of each lower holder.

5. A gang mold comprising a series of sidewise opposed connected together bodily movable molding units, each comprising an open top body member and a pair of removable heads, said heads closing the ends of the body member, a pair of spaced upper holders, each including a vertical flange and a horizontal flange extending outwardly from the lower end of the vertical flange, means for fixedly securing said removable heads to the outer portions of said horizontal flanges, a pair of spaced lower holders, tortionally twisted coupling members secured to said lower holders projecting upwardly between certain of said body members and through the said horizontal flanges, and means extending through the coupling members and in connection with the horizontal flanges for detachably connecting the upper and lower holders together and for clamping said body members to the holders.

6. A gang mold comprising a series of sidewise arranged bodily movable molding units, each including a body member open at its top and ends and a pair of removable heads for closing the open ends and the ends of the open top of said body member, a pair of oppositely disposed holders, each formed of a vertical and an outwardly directed horizontal portion secured at its outer part to the heads at an end of the body members, said horizontal flanges closing the open tops of the body members adjacent said heads and formed with slots, a pair of lower holders abutting the bottoms of said body members, upstanding spaced slotted couplers extending upwardly between pairs of said units and through the slots of said horizontal flanges, and means extending through the slots of the couplers and in connection with said horizontal flanges clamping said units to said holders.

7. A gang mold comprising a series of sidewise arranged bodily movable molding units, each including a body member open at its top and ends and a pair of removable heads for closing the open ends and the ends of the open top of said body member, a pair of oppositely disposed holders, each formed of a vertical flange and a horizontal flange extending outwardly from the lower edge of the vertical flange and provided with slots, a pair of lower holders abutting the bottoms of said body members, upstanding slotted couplers secured to said lower holders, extending between pairs of units and through the slots of the horizontal flanges, and means extending through the slots of the couplers and in connection with said horizontal flanges clamping said units to said holders.

8. A gang mold comprising a series of sidewise arranged bodily movable molding units, each including a body member open at its top and ends and a pair of removable heads for closing the open ends and the ends of the open top of said body member, a pair of oppositely disposed holders, each formed of a vertical flange and a horizontal flange extending outwardly from the lower edge of the vertical flange and provided with slots, a pair of lower holders abutting the bottoms of said body members, upstanding slotted couplers secured to said lower holders, extending between pairs of units and through the slots of the horizontal flanges, means extending through the slots of the couplers and in connection with said horizontal flanges clamping said units to said holders, and the heads of the central unit of said series provided with outwardly opening sockets for the reception of trunnions when inverting the mold.

9. A gang mold comprising a series of sidewise arranged bodily movable molding units, each including a body member open at its top and ends and a pair of removable heads for closing the open ends and the ends of the open top of said body member, a pair of oppositely disposed holders, each formed of a vertical flange and a horizontal flange extending outwardly from the lower edge of the vertical flange and provided with slots, a pair of lower holders abutting the bottoms of said body members, upstanding slotted couplers secured to said lower holders, extending between pairs of units and through the slots of the horizontal flanges, means extending through the slots of the couplers and in connection with said horizontal flanges clamping said units to said holders, each of said lower holders formed of a vertical flange and a horizontal flange extending inwardly from the top of the vertical flange, said couplers secured to the outer faces of the vertical flanges of the lower holders, and spaced blocks constituting supports secured to the inner face of each lower holder.

In testimony whereof, I affix my signature hereto.

GEORGE E. NAGEL.